United States Patent
Schulz

(10) Patent No.: US 11,075,993 B2
(45) Date of Patent: Jul. 27, 2021

(54) DATA TRANSMISSION BETWEEN AN APPLICATION SERVER AND AT LEAST ONE INTERNET-OF-THINGS COMMUNICATION DEVICE USING A MOBILE COMMUNICATION NETWORK

(71) Applicant: DEUTSCHE TELEKOM AG, Bonn (DE)

(72) Inventor: Mario Schulz, Geithain (DE)

(73) Assignee: DEUTSCHE TELEKOM AG, Bonn (DE)

(*) Notice: Subject to any disclaimer, the term of this patent is extended or adjusted under 35 U.S.C. 154(b) by 10 days.

(21) Appl. No.: 16/472,219

(22) PCT Filed: Dec. 15, 2017

(86) PCT No.: PCT/EP2017/082947
§ 371 (c)(1),
(2) Date: Jun. 21, 2019

(87) PCT Pub. No.: WO2018/127380
PCT Pub. Date: Jul. 12, 2018

(65) Prior Publication Data
US 2019/0379739 A1     Dec. 12, 2019

(30) Foreign Application Priority Data

Jan. 3, 2017   (EP) ..................................... 17150212

(51) Int. Cl.
*H04W 8/18* (2009.01)
*H04L 29/08* (2006.01)
(Continued)

(52) U.S. Cl.
CPC ............... *H04L 67/12* (2013.01); *H04W 4/70* (2018.02); *H04W 8/24* (2013.01); *H04W 88/16* (2013.01)

(58) Field of Classification Search
None
See application file for complete search history.

(56) References Cited

U.S. PATENT DOCUMENTS 9,078,086 B2   7/2015  Frid
9,210,596 B1 * 12/2015  Chen ..................... H04W 76/19
(Continued)

FOREIGN PATENT DOCUMENTS

CN   102075857 A   5/2011
CN   102124775 A   7/2011
(Continued)

*Primary Examiner* — Brandon M Renner
(74) *Attorney, Agent, or Firm* — Leydig, Voit & Mayer, Ltd.

(57) ABSTRACT

Data is transmitted between an application server and at least one internet-of-things (IoT) communication device using a mobile communication network. A method for the data transmission includes: the at least one IoT communication device attaching to the mobile communication network via transmitting at least a first portion of first communication data between the at least one IoT communication device and the IoT gateway entity; and the at least one IoT communication device transmitting payload data to the application server via transmitting at least a second portion of the first communication data between the at least one IoT communication device and the IoT gateway entity, and at least part of the second communication data between the IoT gateway entity and the application server.

6 Claims, 1 Drawing Sheet

(51) Int. Cl.
*H04W 4/70* (2018.01)
*H04W 8/24* (2009.01)
*H04W 88/16* (2009.01)

(56) References Cited

U.S. PATENT DOCUMENTS

| | | | |
|---|---|---|---|
| 2004/0171379 A1* | 9/2004 | Cabrera | H04L 67/18 455/422.1 |
| 2005/0128285 A1* | 6/2005 | Berenguer | H04N 7/152 348/14.08 |
| 2008/0176582 A1* | 7/2008 | Ghai | H04L 65/105 455/456.2 |
| 2008/0186986 A1* | 8/2008 | Rigault | H04L 12/66 370/401 |
| 2010/0046544 A1 | 2/2010 | Gill et al. | |
| 2011/0264807 A1* | 10/2011 | Hlibiciuc | H04M 7/0093 709/227 |
| 2012/0173711 A1* | 7/2012 | Bollapalli | H04L 65/104 709/224 |
| 2017/0041785 A1* | 2/2017 | Bone | H04W 12/06 |
| 2018/0176862 A1* | 6/2018 | Maias | H04L 69/06 |
| 2018/0184281 A1* | 6/2018 | Tamagawa | H04L 69/22 |
| 2018/0206093 A1* | 7/2018 | Jain | H04W 4/70 |
| 2018/0219981 A1* | 8/2018 | Backman | H04L 65/102 |

FOREIGN PATENT DOCUMENTS

| | | |
|---|---|---|
| CN | 102223733 A | 10/2011 |
| CN | 102497651 A | 6/2012 |
| CN | 102858026 A | 1/2013 |
| WO | WO 2013007314 A1 | 1/2013 |
| WO | WO 2016193415 A1 | 12/2016 |

* cited by examiner

DATA TRANSMISSION BETWEEN AN APPLICATION SERVER AND AT LEAST ONE INTERNET-OF-THINGS COMMUNICATION DEVICE USING A MOBILE COMMUNICATION NETWORK

CROSS-REFERENCE TO RELATED APPLICATIONS

This application is a U.S. National Phase application under 35 U.S.C. § 371 of International Application No. PCT/EP2017/082947, filed on Dec. 15, 2017, and claims benefit to European Patent Application No. EP 17150212.3, filed on Jan. 3, 2017. The International Application was published in English on Jul. 12, 2018 as WO 2018/127380 A1 under PCT Article 21(2).

FIELD

The present invention relates to a method for data transmission between, on the one hand, an application server, and, on the other hand, at least one internet-of-things communication device using a mobile communication network, wherein the mobile communication network comprises an access network and a core network, wherein the core network comprises an internet-of-things gateway entity and the access network comprises at least one radio cell and a base station entity associated with the at least one radio cell, wherein first communication data are transmitted between the at least one internet-of-things communication device and the internet-of-things gateway entity, and wherein second communication data are transmitted, using an internet protocol-oriented transmission protocol, between the internet-of-things gateway entity and the application server.

Furthermore, the present invention relates to a mobile communication network for data transmission between, on the one hand, an application server, and, on the other hand, at least one internet-of-things communication device using the mobile communication network, wherein the mobile communication network comprises an access network and a core network, wherein the core network comprises an internet-of-things gateway entity and the access network comprises at least one radio cell and a base station entity associated with the at least one radio cell, wherein first communication data are transmitted between the at least one internet-of-things communication device and the internet-of-things gateway entity, and wherein second communication data are transmitted, using an internet protocol-oriented transmission protocol, between the internet-of-things gateway entity and the application server.

Additionally, the present invention relates to a system for data transmission between, on the one hand, an application server, and, on the other hand, at least one internet-of-things communication device using a mobile communication network, wherein the system comprises the mobile communication network, the application server and the internet-of-things communication device, wherein the mobile communication network comprises an access network and a core network, wherein the core network comprises an internet-of-things gateway entity and the access network comprises at least one radio cell and a base station entity associated with the at least one radio cell, wherein first communication data are transmitted between the at least one internet-of-things communication device and the internet-of-things gateway entity, and wherein second communication data are transmitted, using an internet protocol-oriented transmission protocol, between the internet-of-things gateway entity and the application server.

Furthermore, the present invention relates to an internet-of-things communication device suitable for transmitting data to and/or receiving data from an application server using a mobile communication network according to the present invention or being part of a system according to the present invention or according to a method according to the present invention.

Furthermore, the present invention relates to a program comprising a computer readable program code which, when executed on a computer or on an internet-of-things communication device or on a network component of a mobile communication network, especially an internet-of-things gateway entity, or in part on an internet-of-things communication device and in part on a network component of a mobile communication network, especially an internet-of-things gateway entity, causes the computer or the internet-of-things communication device and/or the network component of the mobile communication network to perform a method according to the present invention.

Furthermore, the present invention relates to a computer program product for data transmission between, on the one hand, an application server, and, on the other hand, at least one internet-of-things communication device using a mobile communication network, the computer program product comprising a computer program stored on a storage medium, the computer program comprising program code which, when executed on a computer or on an internet-of-things communication device or on a network component of a mobile communication network, especially an internet-of-things gateway entity, or in part on an internet-of-things communication device and in part on a network component of a mobile communication network, especially an internet-of-things gateway entity, causes the computer or the internet-of-things communication device and/or the network component of the mobile communication network to perform a method according to the present invention.

BACKGROUND

Efficient communication between internet-of-things communication devices and application servers, which e.g., gather information of a multitude of internet-of-things communication devices, becomes increasingly important. Typically, an application server needs to identify the internet-of-things communication device that is transmitting information (i.e. that the application server is receiving a payload from). Usually, the internet protocol (IP)-address of an internet-of-things communication device is dynamically assigned during the attach process with a mobile communication network. To clearly identify an internet-of-things communication device, an application server can, e.g., have access to a database where dynamic internet protocol-addresses are related to the international mobile subscribe identity (IMSI) of an internet-of-things communication device. However, identifying an internet-of-things communication device that is sending payload to an application server in such a way requires a rather large amount of data transfer and is uncomfortable as it at least requires a network operator to provide such a database (interface) to an application server.

SUMMARY

In an exemplary embodiment, the present invention provides a method for data transmission between an application server and at least one internet-of-things (IoT) communication device using a mobile communication network. The mobile communication network comprises an access network and a core network, wherein the core network comprises an IoT gateway entity and the access network comprises at least one radio cell and a base station entity associated with the at least one radio cell. First communication data are transmitted between the at least one IoT communication device and the IoT gateway entity, and second communication data are transmitted, using an Internet Protocol (IP)-oriented transmission protocol, between the IoT gateway entity and the application server. The method comprises: the at least one IoT communication device attaching to the mobile communication network via transmitting at least a first portion of the first communication data between the at least one IoT communication device and the IoT gateway entity; and the at least one IoT communication device transmitting payload data to the application server via transmitting at least a second portion of the first communication data—between the at least one IoT communication device and the IoT gateway entity—, and at least part of the second communication data—between the IoT gateway entity and the application server—. The first portion of the first communication data and/or the second portion of the first communication data comprise a server identity information related to the application server to facilitate the IoT gateway entity, based on the server identity information, selecting the application server out of a plurality of application servers; and/or the second communication data comprise—in a direction from the IoT gateway entity to the application server—, a device identity information related to the at least one IoT communication device to facilitate, based on a device IP address of the at least one IoT communication device, the IoT gateway entity determining the device identity information of the at least one IoT communication device to be sent to the application server.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
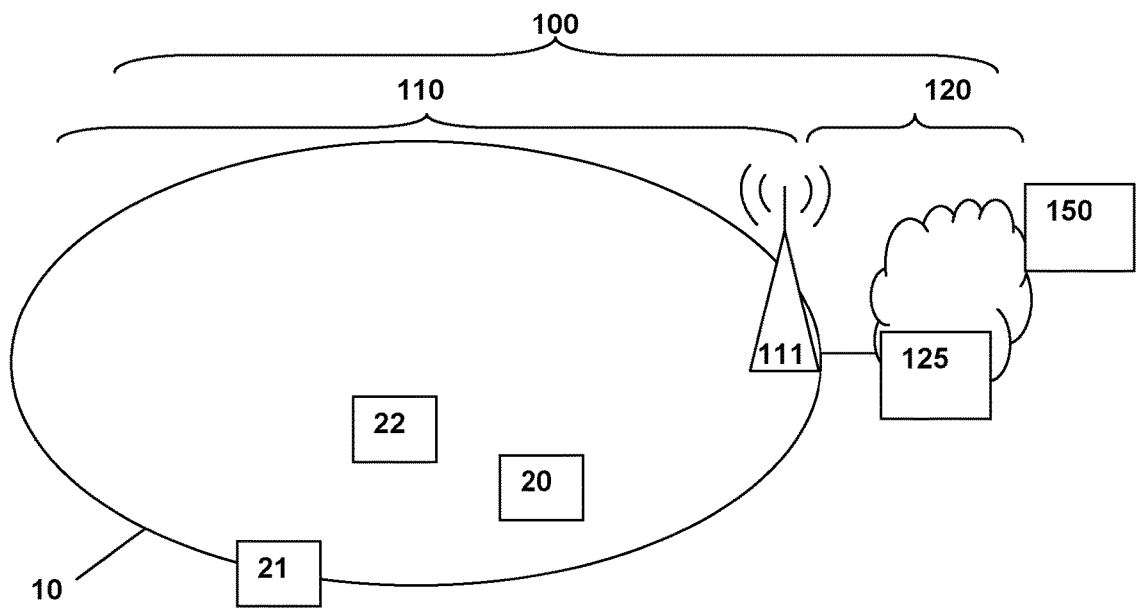
FIG. 1 schematically illustrates a mobile communication network according to an embodiment of the present invention.

Exemplary embodiments of the present invention improve data transmission between an internet-of-things communication device and an application server.

In an exemplary embodiment, the present invention provides a method for data transmission between, on the one hand, an application server, and, on the other hand, at least one internet-of-things communication device using a mobile communication network, wherein the mobile communication network comprises an access network and a core network, wherein the core network comprises an internet-of-things gateway entity and the access network comprises at least one radio cell and a base station entity associated with the at least one radio cell,
wherein first communication data are transmitted between the at least one internet-of-things communication device and the internet-of-things gateway entity, and wherein second communication data are transmitted, using an internet protocol-oriented transmission protocol, between the internet-of-things gateway entity and the application server,
wherein the method comprises the following steps:
  in a first step, the at least one internet-of-things communication device is attached to the mobile communication network via transmitting at least a first portion of the first communication data between the at least one internet-of-things communication device and the internet-of-things gateway entity,
  in a second step, subsequent to the first step, the at least one internet-of-things communication device transmits payload data to the application server via transmitting at least a second portion of the first communication data—between the at least one internet-of-things communication device and the internet-of-things gateway entity, especially using a non-internet protocol transmission protocol—, and at least part of the second communication data—between the internet-of-things gateway entity and the application server, especially using an internet protocol-oriented transmission protocol—,
wherein the first portion of the first communication data and/or the second portion of the first communication data comprise a server identity information related to the application server such that the internet-of-things gateway entity, based on the server identity information, selects the application server out of a plurality of application servers, and/or wherein the second communication data comprise—in the direction from the internet-of-things gateway entity to the application server—, a device identity information related to the internet-of-things communication device such that based on a device internet protocol address of the internet-of-things communication device, the internet-of-things gateway entity determines the device identity information of the internet-of-things communication device to be sent to the application server.

It is thereby advantageously possible according to the present invention that a method for data transmission between an application server and at least one internet-of-things communication device using a mobile communication network is facilitated. This can be achieved by an attachment of the internet-of-things communication device to the mobile communication network in a first step, wherein at least a first portion of the first communication data transmitted between the mobile communication network and the internet-of-things communication device via attaching the internet-of-things communication device to the mobile communication network is transmitted during the first step. It is furthermore possible that in a second step, subsequent to the first step, the internet-of-things communication device transmits payload data, comprising, e.g., data obtained by a sensor of the internet-of-things communication device, information on the usage (frequency of usage etc.) of the internet-of-things communication device or any other data that can be obtained and/or stored by an internet-of-things communication device or by a sensor thereof, to the application server. It is advantageously possible that such payload data is transmitted via transmitting at least a second portion of the first communication data—between the at least one internet-of-things communication device and the internet-of-things gateway entity—, and at least part of the second communication data—between the internet-of-things gateway entity and the application server—. Therein, it is advantageously possible that the first portion of the first communication data and/or the second portion of the first communication data comprises a server identity information related to the application server such that the internet-of-things gateway entity, based on the server identity information, selects the application server out of a plurality of application servers, and/or that the second communication data comprise—in the direction from the internet-of-things gateway entity to the application server—, a device identity information related to the internet-of-things communication device such that based on a device internet protocol address of the internet-of-things communication device, the internet-of-things gateway entity determines the device identity information of the internet-of-things communication device to be sent to the application server. Accordingly, it is possible that the internet-of-things communication device transmits a server identity information related to the application server within the first or second portion of the first communication data toward the internet-of-things gateway entity which enables the internet-of-things gateway entity to select the application server, to which the payload data (or part of the payload data) is directed. Furthermore, it is possible that the internet-of-things gateway entity determines the device identity information of the internet-of-things communication device based on the device internet protocol address of the internet-of-things communication device. Consequently, the internet-of-things gateway entity can send such a device identity information related to the internet-of-things communication device as part of the second communication data to the application server. As a consequence, it is advantageously possible that the device identity information related to the internet-of-things communication device is afterwards known to the application server, such that the application server is supplied with enough information to know from which internet-of-things communication device the payload data was sent. Accordingly, the application server does not (only) obtain the internet protocol address of the internet-of-things communication device, which the application server receives payload from, but also knows a device identity information related to this internet-of-things communication device. As a consequence, it is advantageously possible according to the present invention that internet-of-things communication device does not have to transmit a device identity information (concerning itself) within or as part of the second portion of the first communication data (i.e. once the internet-of-things communication device is used—after being attached to the mobile communication network—on an operational basis to transmit payload data as part of the second portion of the first communication data), which decreases the amount of data that is to be transmitted from the internet-of-things communication device to the internet-of-things gateway entity. As a consequence, according to exemplary embodiments of the inventive method, resources within the access network can be saved, which yields, e.g., the possibility to increase the number of internet-of-things communication devices per base station entity within the access network. The present invention is e.g., particularly useful in case a dynamic internet protocol address is assigned to the internet-of-things communication device.

According to an embodiment of the present invention, the first communication data are transmitted, between the at least one internet-of-things communication device and the internet-of-things gateway entity, using a non-internet protocol transmission protocol, and/or wherein the device identity information—to be transmitted to the application server as part of the second communication data and based on the device internet protocol address of the internet-of-things communication device—is exchanged by the internet-of-things communication device with the internet-of-things gateway entity, especially once per attachment of the internet-of-things communication device, and especially as part of the first portion of the first communication data.

Thereby, it is possible according to an embodiment of the present invention that the first communication data are transmitted, between the at least one internet-of-things communication device and the internet-of-things gateway entity, using a non-internet protocol transmission protocol. Consequently, mobile internet-of things technologies such as narrowband internet-of-things (or possibly any other low power wide area technology) can be advantageously incorporated into the data transfer of the first communication data. It is also advantageously possible that the device identity information is exchanged by the internet-of-things communication device with the internet-of-things gateway entity especially once per attachment of the internet-of-things communication device and especially as part of the first portion of the first communication data, whereby the internet-of-things gateway entity afterward knows the device identity information related to the internet-of-things communication device. This saves network resources as the device identity information does not need to be transmitted from the internet-of-things communication device to the internet-of-things gateway entity during every transmission of a second portion of the first communication data. This can e.g. be particularly useful when using low power wide area technologies during the transmission of the first communication data between the internet-of-things communication device and the internet-of-things gateway entity.

According to an embodiment of the present invention, the application server is selected out of the plurality of application servers via using a server mapping table within or accessible to the internet-of-things gateway entity.

Thereby, it is advantageously possible according to an embodiment of the present invention that the selection of the application server out of the plurality of application servers is carried out by the internet-of-things gateway entity using, e.g., the server identity information and employing a server mapping table within or accessible to the internet-of-things gateway entity.

According to an embodiment of the present invention, the server identity information corresponds to a destination system identifier, being especially transmitted, to the mobile communication network, once per attachment of the internet-of-things communication device, and especially as part of the first portion of the first communication data, wherein the internet-of-things gateway entity especially selects the application server, using the server mapping table, via determining a target internet protocol address and/or a domain name system-name of the application server, the target internet protocol address and/or the domain name system-name of the application server being dependent on the server identity information transmitted—in uplink direction from the internet-of-things communication device towards the internet-of-things gateway entity—as part of the first communication data, wherein especially the target internet protocol address and/or the domain name system-name of the application server is exclusively used as part of the second communication data, and is absent from the first communication data.

Thereby, it is advantageously possible according to an embodiment of the present invention that the internet-of-things gateway entity determines a target internet protocol address and/or a domain name system-name of the application server dependent on the server identity information (i.e. the destination system identifier) transmitted—in uplink direction from the internet-of-things communication device towards the internet-of-things gateway entity—as part of the first communication data. Accordingly, the target internet protocol address and/or the domain name system-name of the application server can advantageously be absent from the first communication data (transmitted between the internet-of-things communication device and the internet-of-things gateway entity), reducing the amount of data that needs to be transmitted between the internet-of-things gateway entity and the internet-of-things communication device with respect to conventional methods. This can e.g. be particularly useful when using low power wide area technologies during the transmission of the first communication data between the internet-of-things communication device and the internet-of-things gateway entity.

According to an embodiment of the present invention, the server identity information is transmitted repeatedly to the mobile communication network, especially as part of the second portion of the first communication data.

Thereby, it is advantageously possible according to an embodiment of the present invention that the server identity information is transmitted repeatedly (e.g., more than just once) to the mobile communication network (by the internet-of-things communication device), which can, e.g., be beneficial in case the internet-of-things communication device aims to transmit payload data to the application server repeatedly. In such a case, it is possible that the internet-of-things gateway entity can determine the application server out of the plurality of application servers based on the transmitted server identity information (e.g., transmitted by the internet-of-things communication device to the internet-of-things gateway entity as part of the first communication data), whenever payload information is to be transmitted from the internet-of-things communication device to the application server.

According to an embodiment of the present invention, the server identity information is transmitted, as part of the first communication data, especially as part of the signaling header of the first communication data.

Thereby, it is advantageously possible according to an embodiment of the present invention that the server identity information is transmitted between the internet-of-things communication device and the internet-of-things gateway entity as part of the first communication data. It is preferably possible that the server identity information is comprised in the signaling header of the first communication data.

According to an embodiment of the present invention, the device identity information corresponds to the international mobile subscriber identifier of the internet-of-things communication device, wherein the internet-of-things gateway entity especially determines the device identity information of the internet-of-things communication device, using a device mapping table and based on the device internet protocol address, and transmits the device identity information in uplink direction towards the application server as part of the second communication data, wherein the device identity information is especially absent from the second portion of the first communication data.

Thereby, it is advantageously possible according to an embodiment of the present invention that the device identity information corresponds to the international mobile subscriber identifier of the internet-of-things communication device. Furthermore, it is possible according to an embodiment of the present invention that a device mapping table is used such that the internet-of-things gateway entity can determine the device identity information (i.e., the international mobile subscriber identifier) based on the device internet protocol address of the internet-of-things communication device. Accordingly, it is possible that the internet-of-things gateway entity transmits the device identity information (after it has been determined by the internet-of-things gateway entity) as part of the second communication data to the application server such that afterward the application server knows the device identity information of the internet-of-things communication device that it receives particular payload data from. Consequently, the device identity information does not need to be comprised in (i.e., can be absent from) the second portion of the first communication data, but the application server can still receive the device identity information related to the internet-of-things communication device as part of the second communication data from the internet-of-things gateway entity.

According to an embodiment of the present invention, the device identity information is transmitted—besides the payload data—as part of a payload portion of an internet protocol data packet transmitted between the internet-of-things gateway entity and the application server.

Thereby, it is advantageously possible according to an embodiment of the present invention that the device identity information is transmitted within the payload portion (together with the payload data) of an internet protocol data packet (second communication data).

According to an embodiment of the present invention, the device identity information is transmitted as part of an internet protocol version 6 extension header of an internet protocol data packet transmitted between the internet-of-things gateway entity and the application server.

According to an embodiment of the present invention, the device identity information is transmitted as part of an internet protocol version 6 header—especially the device-defined part of the internet protocol version 6 header and/or the device-defined part of the internet protocol version 6 address—of an internet protocol data packet transmitted between the internet-of-things gateway entity and the application server.

According to an embodiment of the present invention, the device identity information is transmitted as part of an internet protocol version 6 header—especially the device-defined part of the internet protocol version 6 header and/or the device-defined part of the internet protocol version 6 address—of an internet protocol data packet transmitted between the internet-of-things communication device and the application server.

Via transmitting the device identity information as part of an internet protocol version 6 header of an internet protocol data packet, it is advantageously possible according to an embodiment of the present invention that the device identity information is incorporated into the internet protocol version 6 header, preferably into the device-defined part of the internet protocol version 6 header and/or the device-defined part of the internet protocol version 6 address, of an internet protocol data packet as part of the second communication data transmitted between either the internet-of-things gateway entity or the internet-of-things communication device, on the one hand, and the application server (out of the plurality of application servers), on the other hand.

Furthermore, in an exemplary embodiment, the present invention provides a mobile communication network for data transmission between, on the one hand, an application server, and, on the other hand, at least one internet-of-things communication device using the mobile communication network, wherein the mobile communication network comprises an access network and a core network, wherein the core network comprises an internet-of-things gateway entity and the access network comprises at least one radio cell and a base station entity associated with the at least one radio cell, wherein first communication data are transmitted between the at least one internet-of-things communication device and the internet-of-things gateway entity, and wherein second communication data are transmitted, using an internet protocol-oriented transmission protocol, between the internet-of-things gateway entity and the application server,
wherein the mobile communication network is configured such that:
  the at least one internet-of-things communication device is attached to the mobile communication network via transmitting at least a first portion of the first communication data between the at least one internet-of-things communication device and the internet-of-things gateway entity,
  the mobile communication network receives payload data from the at least one internet-of-things communication device in view of transmission of the payload data to the application server, the payload data being transmitted via transmitting at least a second portion of the first communication data—between the at least one internet-of-things communication device and the internet-of-things gateway entity—, and at least part of the second communication data—between the internet-of-things gateway entity and the application server—,
wherein the first portion of the first communication data and/or the second portion of the first communication data comprise a server identity information related to the application server such that the internet-of-things gateway entity, based on the server identity information, selects the application server out of a plurality of application servers,
and/or
wherein the second communication data comprise—in the direction from the internet-of-things gateway entity to the application server—a device identity information related to the internet-of-things communication device such that based on a device internet protocol address of the internet-of-things communication device, the internet-of-things gateway entity determines the device identity information of the internet-of-things communication device to be sent to the application server.

It is thereby advantageously possible according to the present invention that a mobile communication network is employed for data transmission between an application server and at least one internet-of-things communication device using a mobile communication network. This can be achieved by an attachment of the internet-of-things communication device to the mobile communication network, wherein at least a first portion of the first communication data transmitted between the mobile communication network and the internet-of-things communication device via attaching the internet-of-things communication device to the mobile communication network is transmitted during the attachment. It is furthermore possible that, subsequent to the attachment, the internet-of-things communication device transmits payload data, comprising, e.g., data obtained by a sensor of the internet-of-things communication device, information on the usage (frequency of usage etc.) of the internet-of-things communication device or any other data that can be obtained and/or stored by an internet-of-things communication device, to the mobile communication network in view of transmitting the payload data (or a portion thereof) further to the application server. It is advantageously possible that such payload data is transmitted via transmitting at least a second portion of the first communication data—between the at least one internet-of-things communication device and the internet-of-things gateway entity—, and at least part of the second communication data—between the internet-of-things gateway entity and the application server—. Therein, it is advantageously possible that the first portion of the first communication data and/or the second portion of the first communication data comprise a server identity information related to the application server such that the internet-of-things gateway entity, based on the server identity information, selects the application server out of a plurality of application servers,
and/or
that the second communication data comprise—in the direction from the internet-of-things gateway entity to the application server—, a device identity information related to the internet-of-things communication device such that based on a device internet protocol address of the internet-of-things communication device, the internet-of-things gateway entity determines the device identity information of the internet-of-things communication device to be sent to the application server. Accordingly, it is possible that the internet-of-things communication device transmits a server identity information related to the application server within the first or second portion of the first communication data toward the internet-of-things gateway entity which enables the internet-of-things gateway entity to select the application server, to which the payload data (or part of the payload data) is directed. Furthermore, it is possible that the internet-of-things gateway entity determines the device identity information of the internet-of-things communication device based on the device internet protocol address of the internet-of-things communication device. Consequently, the internet-of-things gateway entity can send such a device identity information related to the internet-of-things communication device as part of the second communication data to the application server. As a consequence, it is advantageously possible that the device identity information related to the internet-of-things communication device is afterward known to the application server, such that the application server is supplied with enough information to know from which internet-of-things communication device the payload data was sent. Accordingly, the application server does not (only) obtain the internet protocol address of the internet-of-things communication device, which the application server receives payload from, but also knows a device identity information related to this internet-of-things communication device. As a consequence, it is advantageously possible according to the present invention that internet-of-things communication device does not have to transmit a device identity information (concerning itself) within the first communication data, which decreases the amount data that is to be transmitted from the internet-of-things communication device to the internet-of-things gateway entity. As a consequence, exemplary embodiments of the inventive mobile communication network provide the possibility to save resources within the access network, which yields, e.g., the possibility to increase the number of internet-of-things communication devices per base station entity within the access network. The present invention is e.g., particularly useful in case a dynamic internet protocol address is assigned to the internet-of-things communication device.

In an exemplary embodiment, the present invention provides a system for data transmission between, on the one hand, an application server, and, on the other hand, at least one internet-of-things communication device using a mobile communication network, wherein the system comprises the mobile communication network, the application server and the internet-of-things communication device, wherein the mobile communication network comprises an access network and a core network, wherein the core network comprises an internet-of-things gateway entity and the access network comprises at least one radio cell and a base station entity associated with the at least one radio cell,
wherein first communication data are transmitted between the at least one internet-of-things communication device and the internet-of-things gateway entity, and wherein second communication data are transmitted, using an internet protocol-oriented transmission protocol, between the internet-of-things gateway entity and the application server,
wherein the system is configured such that:
the at least one internet-of-things communication device is attached to the mobile communication network via transmitting at least a first portion of the first communication data between the at least one internet-of-things communication device and the internet-of-things gateway entity,
the at least one internet-of-things communication device transmits payload data to the application server via transmitting at least a second portion of the first communication data—between the at least one internet-of-things communication device and the internet-of-things gateway entity—, and at least part of the second communication data—between the internet-of-things gateway entity and the application server—,
wherein the first portion of the first communication data and/or the second portion of the first communication data comprise a server identity information related to the application server such that the internet-of-things gateway entity, based on the server identity information, selects the application server out of a plurality of application servers,
and/or
wherein the second communication data comprise—in the direction from the internet-of-things gateway entity to the application server—, a device identity information related to the internet-of-things communication device such that based on a device internet protocol address of the internet-of-things communication device, the internet-of-things gateway entity determines the device identity information of the internet-of-things communication device to be sent to the application server.

It is thereby advantageously possible according to the present invention that a system for data transmission between an application server and at least one internet-of-things communication device using a mobile communication network is employed. This can be achieved by an attachment of the internet-of-things communication device to the mobile communication network, wherein at least a first portion of the first communication data transmitted between the mobile communication network and the internet-of-things communication device via attaching the internet-of-things communication device to the mobile communication network is transmitted during the attachment. It is furthermore possible that, subsequent to the attachment, the internet-of-things communication device transmits payload data, comprising, e.g., data obtained by a sensor of the internet-of-things communication device, information on the usage (frequency of usage etc.) of the internet-of-things communication device or any other data that can be obtained and/or stored by an internet-of-things communication device, to the mobile communication network in view of transmitting the payload data (or a portion thereof) further to the application server. It is advantageously possible that such payload data is transmitted via transmitting at least a second portion of the first communication data—between the at least one internet-of-things communication device and the internet-of-things gateway entity—, and at least part of the second communication data—between the internet-of-things gateway entity and the application server—. Therein, it is advantageously possible that the first portion of the first communication data and/or the second portion of the first communication data comprise a server identity information related to the application server such that the internet-of-things gateway entity, based on the server identity information, selects the application server out of a plurality of application servers,
and/or
that the second communication data comprise—in the direction from the internet-of-things gateway entity to the application server—, a device identity information related to the internet-of-things communication device such that based on a device internet protocol address of the internet-of-things communication device, the internet-of-things gateway entity determines the device identity information of the internet-of-things communication device to be sent to the application server. Accordingly, it is possible that the internet-of-things communication device transmits a server identity information related to the application server within the first or second portion of the first communication data toward the internet-of-things gateway entity which enables the internet-of-things gateway entity to select the application server, to which the payload data (or part of the payload data) is directed. Furthermore, it is possible that the internet-of-things gateway entity determines the device identity information of the internet-of-things communication device based on the device internet protocol address of the internet-of-things communication device. Consequently, the internet-of-things gateway entity can send such a device identity information related to the internet-of-things communication device as part of the second communication data to the application server. As a consequence, it is advantageously possible that the device identity information related to the internet-of-things communication device is afterward known to the application server, such that the application server is supplied with enough information to know from which internet-of-things communication device the payload data was sent. Accordingly, the application server does not (only) obtain the internet protocol address of the internet-of-things communication device, which the application server receives payload from, but also knows a device identity information related to this internet-of-things communication device. As a consequence, it is advantageously possible according to the present invention that internet-of-things communication device does not have to transmit a device identity information (concerning itself) within the first communication data, which decreases the amount data that is to be transmitted from the internet-of-things communication device to the internet-of-things gateway entity. As a consequence, exemplary embodiments of the inventive system provide the possibility to save resources within the access network, which yields, e.g., the possibility to increase the number of internet-of-things communication devices per base station entity within the access network. The present invention is e.g., particularly useful in case a dynamic internet protocol address is assigned to the internet-of-things communication device.

Additionally, in an exemplary embodiment, the present invention provides an internet-of-things communication device suitable for transmitting data to and/or receiving data from an application server using a mobile communication network according to the present invention or being part of a system according to the present invention or according to a method according to an embodiment of the present invention.

Still additionally, in an exemplary embodiment, the present invention provides a program comprising a computer readable program code which, when executed on a computer or on an internet-of-things communication device or on a network component of a mobile communication network, especially an internet-of-things gateway entity, or in part on an internet-of-things communication device and in part on a network component of a mobile communication network, especially an internet-of-things gateway entity, causes the computer or the internet-of-things communication device and/or the network component of the mobile communication network to perform a method according to an embodiment of the present invention.

Still additionally, in an exemplary embodiment, the present invention provides a computer program product for data transmission between, on the one hand, an application server, and, on the other hand, at least one internet-of-things communication device using a mobile communication network, the computer program product comprising a computer program stored on a storage medium, the computer program comprising program code which, when executed on a computer or on an internet-of-things communication device or on a network component of a mobile communication network, especially an internet-of-things gateway entity, or in part on an internet-of-things communication device and in part on a network component of a mobile communication network, especially an internet-of-things gateway entity, causes the computer or the internet-of-things communication device and/or the network component of the mobile communication network to perform a method according to an embodiment of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 according to an embodiment of the present invention is shown. The mobile communication network 100 comprises an access network 110 and a core network 120. The core network 120 comprises an internet-of-things gateway entity 125 (e.g., an access point name capable of non-internet protocol based data transmission). The access network 110 comprises at least one radio cell 10 with at least one base station entity 111 (e.g., a narrowband internet-of-things Evolved Node B (eNodeB)). Within the radio cell 10 a plurality of internet-of-things communication devices 20, 21, 22 are arranged. Furthermore, an application server 150 (e.g., a server of a subscriber of the mobile communication network 100) is associated (or linked) with the mobile communication network 100 or comprised therein, wherein the internet-of-things gateway entity 125 can communicate (e.g., via a variety of intermediate network entities) with the application server 150. The mobile communication network 100 is configured to provide mobile communication services to the internet-of-things communication devices 20, 21, 22 (or user equipments) within the radio cell 10 of the mobile communication network 100. Preferably, the radio cell 10 offers narrowband internet-of-things communication. Preferably, mobile communication data (i.e. first communication data) are transmitted between the internet-of-things communication devices 20, 21, 22 and the mobile communication network via the base station entity 111, wherein the mobile communication data are usually transmitted with rather low bandwidth 600 bits/s up to 200 kbits/s within the narrowband internet-of-things radio cell 10.

Figure 2:
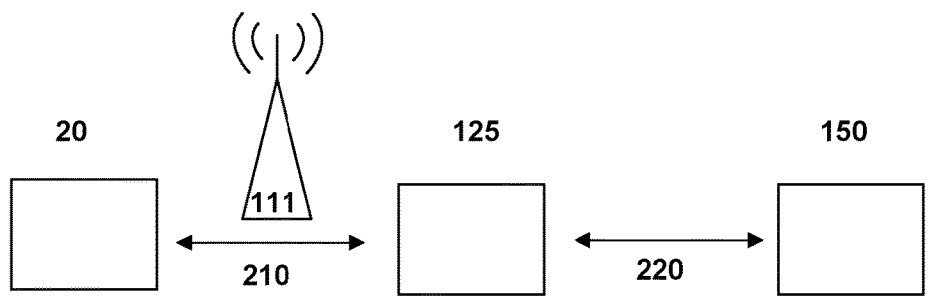
FIG. 2 schematically illustrates a flow diagram according to an embodiment of the present invention.

In FIG. 2, a schematic flow diagram according to an embodiment of the present invention is shown.

In a first step, the internet-of-things communication device 20 (e.g., a sensor associated to an internet-of-things modem) is attached to the mobile communication network 100 via transmitting at least a first portion of the first communication data 210 between the internet-of-things communication device 20 and the internet-of-things gateway entity 125 (e.g., via a base station entity 111).

In a second step, the internet-of-things communication device 20 transmits payload data to the application server 150 via transmitting at least a second portion of the first communication data 210 (via a base station entity 111) to the internet-of-things gateway entity 125. The first communication data 210 is preferably transmitted (at least partly) through a low power wide area technology (such as narrowband internet-of-things) between the internet-of-things communication device 20 and the base station entity 111 toward the internet-of-things gateway entity 125. The first portion of the first communication data 210 and/or the second portion of the first communication data 210 comprise a server identity information 150' related to the application server 150, which the payload data is directed to. Preferably, the server identity information 150' corresponds to a destination system identifier. The internet-of-things gateway entity 125 selects the application 150 based on the server identity information 150' and with the help of a server mapping table via determining a target internet protocol address and/or a domain name system-name of the application server 150. The server identity information 150' is, e.g., transmitted as part of the signaling header 212 of the first communication data 210 (as, e.g., further illustrated in the lower part of FIG. 4) or as part of the payload portion 211 (as, e.g., further illustrated in the lower of FIG. 4) and/or once or repeatedly as part of the second portion of the first communication data 210 from the internet-of-things communication device 20 to the internet-of-things gateway entity 125, e.g., as part of the signaling header 212 of the first communication data 210 (as, e.g., further illustrated in the lower part of FIG. 4) or as part of the payload portion 211 (as, e.g., further illustrated in the lower of FIG. 4).

Still within the second step, with the help of a device mapping table and based on the device internet protocol address of the internet-of-things communication device 20, the internet-of-things gateway entity 125 determines the device identity information 20' (e.g., the international mobile subscriber identity or the subscriber identity module) of the internet-of-things communication device 20. Consequently, the device identity information 20' is incorporated into the transmission of second communication data 220 from the internet-of-things gateway entity 125 toward the application server 150. Therein, in a first embodiment, the device identity information 20' is transmitted besides the payload data, which is the same payload data transmitted from the internet-of-things communication device 20 toward the internet-of-things gateway entity 125 within the second part of the first communication data 210, or which is at least related to this payload data as part of a payload portion 221 of an internet protocol data packet transmitted between the internet-of-things gateway entity 125 and the application server 150. Such a case of second communication data 220 is shown in the upper part of FIG. 3. In a second embodiment, the device identity information 20' is transmitted as part of an internet protocol version 6 extension header 223 of an internet protocol data packet (second communication information 220) transmitted between the internet-of-things gateway entity 125 and the application server 150. Such a case of second communication data 220 is shown in the lower part of FIG. 3. In a third embodiment, the device identity information 20' is transmitted as part of an internet protocol version 6 header 224—especially the device-defined part of the internet protocol version 6 header and/or the device-defined part of the internet protocol version 6 address of an internet protocol data packet (second communication information 220) transmitted between the internet-of-things gateway entity 125 and the application server 150. According to these embodiments of the present invention, the device identity information 20' is preferably absent from the second portion of the first communication data 210 transmitted between the internet-of-things communication device 20 and the internet-of-things gateway entity 125. According to a preferred embodiment of the present invention, the target internet protocol address and/or the domain name system-name of the application server 150 is exclusively used as part of the second communication data 220, and is absent from the first communication data 210.

Figure 3:
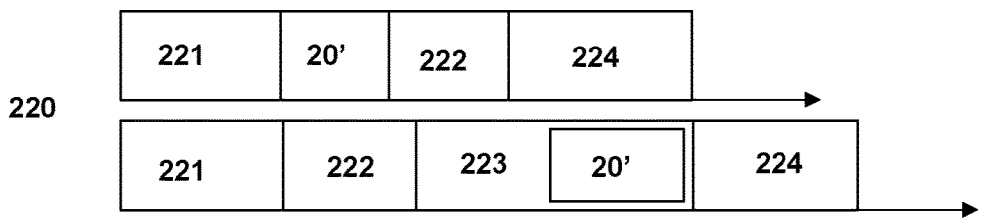
FIG. 3 schematically illustrates two examples of diagrams of the second communication data that is transmitted between the internet-of-things gateway entity and the application server according to two embodiments according to the present invention.

In FIG. 3, two schematic diagrams as examples of the second communication data 220, comprising, e.g., payload data (within the payload portion 221), a user data protocol header 222 and an internet protocol header (e.g., an internet protocol version 6 header 224), that is transmitted between the internet-of-things gateway entity 125 and the application server 150 according to two embodiments according to the present invention are shown.

In the upper embodiment, the device identity information 20' (e.g., the international mobile subscriber identity) is incorporated by the internet-of-things gateway entity 125 into the second communication data 220 as part of the payload portion 221.

In the lower embodiment, the device identity information 20' (e.g., the international mobile subscriber identity) is included in the internet protocol header, e.g., the internet protocol version 6 extension header 223 and transmitted from the internet-of-things gateway entity 125 to the application server 150 as part of the second communication data 220.

Figure 4:
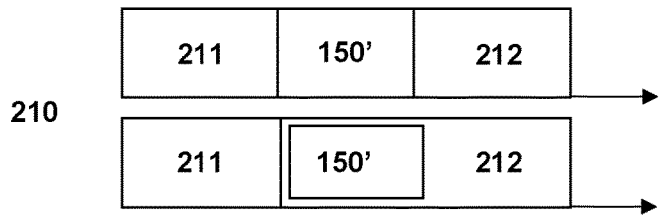
FIG. 4 schematically illustrates two examples diagrams of the first communication data that is transmitted between the internet-of-things communication device and the internet-of-things gateway entity according to two embodiments according to the present invention.

In FIG. 4, two schematic diagrams as examples of the first communication data 210 comprising payload data (within a payload portion 211) and a signaling header 212, that is transmitted between the internet-of-things communication device 20 and the internet-of-things gateway entity 125 according to two embodiments according to the present invention are shown.

In the upper embodiment, the server identity information 150' is incorporated into the first communication data 210 as part of the payload portion 211.

In the lower embodiment, the server identity information 150' is included in the signaling header 212 of the first communication data 210.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for data transmission between an application server and at least one internet-of-things (IoT) communication device using a mobile communication network, wherein the method comprises:
communicating, by an IoT gateway entity of a core network of the mobile communication network, with an IoT communication device for attachment of the IoT communication device to the mobile communication network;

receiving, by the IoT gateway entity, payload data from the IoT communication device as part of first communication data transmitted between the IoT communication device and the IoT gateway entity, wherein the first communication data comprises repeated transmissions of server identity information related to the application server from the IoT communication device to the IoT gateway entity;

selecting, by the IoT gateway entity, the application server out of a plurality of application servers based on the server identity information and based on a server mapping table; and sending, by the IoT gateway entity, the payload data to the application server as part of second communication data transmitted between the IoT gateway entity and the application server, wherein the second communication data utilizes an Internet Protocol (IP)-oriented transmission protocol;

wherein the server identity information corresponds to a destination system identifier transmitted to the mobile communication network once per attachment of the IoT communication device, and as part of the communicating for attachment of the IoT communication device to the mobile communication network;

wherein selecting the application server based on the server mapping table comprises determining a target IP address and/or a domain name system (DNS)-name of the application server based on the server identity information; and wherein the target IP address and/or the DNS-name of the application server is included in the second communication data transmitted between the IoT gateway entity and the application server.

2. The method according to claim 1, wherein the first communication data are transmitted between the IoT communication device and the IoT gateway entity using a non-IP transmission protocol.

3. The method according to claim 1, wherein the server identity information is transmitted, as part of the first communication data, as part of a signaling header of the first communication data.

4. A mobile communication network for data transmission between an application server and at least one internet-of-things (IoT) communication device using the mobile communication network, wherein the mobile communication network comprises:

an access network comprising at least one radio cell and a base station entity associated with the at least one radio cell; and a core network comprising an IoT gateway entity;

wherein the IoT gateway entity is configured to:
communicate with an IoT communication device for attachment of the IoT communication device to the mobile communication network;

receive payload data from the IoT communication device as part of first communication data transmitted between the IoT communication device and the IoT gateway entity, wherein the first communication data comprises repeated transmissions of server identity information related to the application server from the IoT communication device to the IoT gateway entity;

select the application server out of a plurality of application servers based on the server identity information and based on a server mapping table; and send the payload data to the application server as part of second communication data transmitted between the IoT gateway entity and the application server, wherein the second communication data utilizes an Internet Protocol (IP)-oriented transmission protocol;

wherein the server identity information corresponds to a destination system identifier transmitted to the mobile communication network once per attachment of the IoT communication device, and as part of the communicating for attachment of the IoT communication device to the mobile communication network;

wherein selecting the application server based on the server mapping table comprises determining a target IP address and/or a domain name system (DNS)-name of the application server based on the server identity information; and wherein the target IP address and/or the DNS-name of the application server is included in the second communication data transmitted between the IoT gateway entity and the application server.

5. A system for data transmission between an application server and at least one internet-of-things (IoT) communication device using a mobile communication network, wherein the system comprises:

the mobile communication network;
the application server; and
the at least one IoT communication device;
wherein the mobile communication network comprises an access network and a core network, wherein the core network comprises an IoT gateway entity and the access network comprises at least one radio cell and a base station entity associated with the at least one radio cell;

wherein the IoT gateway entity is configured to:
communicate with an IoT communication device for attachment of the IoT communication device to the mobile communication network;

receive payload data from the IoT communication device as part of first communication data transmitted between the IoT communication device and the IoT gateway entity, wherein the first communication data comprises repeated transmissions of server identity information related to the application server from the IoT communication device to the IoT gateway entity;

select the application server out of a plurality of application servers based on the server identity information and based on a server mapping table; and send the payload data to the application server as part of second communication data transmitted between the IoT gateway entity and the application server, wherein the second communication data utilizes an Internet Protocol (IP)-oriented transmission protocol;

wherein the server identity information corresponds to a destination system identifier transmitted to the mobile communication network once per attachment of the IoT communication device, and as part of the communicating for attachment of the IoT communication device to the mobile communication network;

wherein selecting the application server based on the server mapping table comprises determining a target IP address and/or a domain name system (DNS)-name of the application server based on the server identity information; and wherein the target IP address and/or the DNS-name of the application server is included in the second communication data transmitted between the IoT gateway entity and the application server.

6. An internet-of-things (IoT) gateway entity of a core network of a mobile communication network, wherein the IoT gateway entity comprises a processor and a non-transitory memory having instructions stored thereon, wherein the instructions, when executed by the processor, facilitate:

communicating with an IoT communication device for attachment of the IoT communication device to the mobile communication network;

receiving payload data from the IoT communication device as part of first communication data transmitted between the IoT communication device and the IoT gateway entity, wherein the first communication data comprises repeated transmissions of server identity information related to the application server from the IoT communication device to the IoT gateway entity;

selecting the application server out of a plurality of application servers based on the server identity information and based on a server mapping table; and sending the payload data to the application server as part of second communication data transmitted between the IoT gateway entity and the application server, wherein the second communication data utilizes an Internet Protocol (IP)-oriented transmission protocol;

wherein the server identity information corresponds to a destination system identifier transmitted to the mobile communication network once per attachment of the IoT communication device, and as part of the communicating for attachment of the IoT communication device to the mobile communication network;

wherein selecting the application server based on the server mapping table comprises determining a target IP address and/or a domain name system (DNS)-name of the application server based on the server identity information; and wherein the target IP address and/or the DNS-name of the application server is included in the second communication data transmitted between the IoT gateway entity and the application server.

\* \* \* \* \*